(12) United States Patent
Acharya (10) Patent No.: US 7,809,808 B2
(45) Date of Patent: Oct. 5, 2010

(54) METHOD, SYSTEM, AND PROGRAM PRODUCT FOR ANALYZING A SCALABILITY OF AN APPLICATION SERVER (75) Inventor: Amit P. Acharya, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 2092 days.

(21) Appl. No.: 10/690,756

(22) Filed: Oct. 22, 2003

(65) Prior Publication Data

US 2005/0091366 A1 Apr. 28, 2005

(51) Int. Cl.
*G06F 15/177* (2006.01)
(52) U.S. Cl. .................................................. 709/220
(58) Field of Classification Search ............... 703/22; 709/220
See application file for complete search history.

(56) References Cited

U.S. PATENT DOCUMENTS

| | | | |
|---|---|---|---|
| 6,311,144 B1* | 10/2001 | Abu El Ata | 703/21 |
| 6,434,513 B1 | 8/2002 | Sherman et al. | |
| 6,446,120 B1 | 9/2002 | Dantressangle | |
| 6,993,747 B1* | 1/2006 | Friedman | 717/124 |
| 2003/0074423 A1 | 4/2003 | Mayberry et al. | |
| 2003/0093717 A1 | 5/2003 | Mason | |

FOREIGN PATENT DOCUMENTS

| | | |
|---|---|---|
| JP | 2002318708 A2 | 10/2002 |
| WO | WO 97/44729 * | 11/1997 |

OTHER PUBLICATIONS

"Glossary" http://java.sun.com/products/jlf/ed2/book/HIG.Glossary.html retrieved Mar. 18, 2009.*
Empirix, News + Events: Press Releases, "Empirix Bean-Test 4.0 Eases and Expands Performance and Scalability Testing of Enterprise Javabeans Applications", Dated: 2003, pp. 1-2.
Empirix, "e-Load: Load Testing for Web Applications", Dated: 2003, pp. 1-2.

* cited by examiner

*Primary Examiner*—Larry Donaghue
(74) *Attorney, Agent, or Firm*—Jeanine S. Ray-Yarletts; Law Office of Jim Boice (57) ABSTRACT

Under the present invention, a test configuration is provided. The test configuration sets forth a particular enterprise computer architecture of nodes, servers and resources, as well as a quantity of components/beans for an application. Thereafter, the application is generated using a template to replicate the provided quantity of components/beans, and is deployed, installed and started on the application server(s). After the application is started, a client program generated based on the test configuration is run against the application. Throughout the process, (e.g., as the application is being deployed, installed and started, and while the client program is being run), certain performance metrics are monitored to determine the scalability of the application server(s).

3 Claims, 5 Drawing Sheets

METHOD, SYSTEM, AND PROGRAM PRODUCT FOR ANALYZING A SCALABILITY OF AN APPLICATION SERVER

BACKGROUND OF THE INVENTION

1. Field of the Invention

The present invention generally relates to a method, system and program product for analyzing a scalability of an application server. Specifically, the present invention provides a way to determine/verify how well an application server scales with respect to an application having a large quantity of beans or components.

2. Related Art

As computer technology continues to advance, organizations are increasingly implementing computerized solutions to meet their business needs. For example, many organizations rely on one or more computer applications to perform essential business tasks. Such tasks can range from ordering goods/services, to interfacing with customers. To this extent, many organizations have implemented complex computer networks and enterprise systems that can include any quantity of nodes, servers and resources. One issue that arises for many such organizations is the ability to verify the scalability of its application servers. Specifically, many organizations would prefer to know how well an application server can handle a particular application before the application is actually deployed and run. This is especially the case for more complex applications that have a large quantity of components or beans. As is known, a component or bean is a reusable program building block that can be combined with other components in the same or other computers in a distributed network to form an enterprise application. Before an application with a large quantity of components/beans is deployed, it would be advantageous for the organization to know whether the infrastructure (e.g., the application server(s)) can handle the deployment. It could be the case that an application with a large quantity of components/beans would require a different configuration than was originally planned to operate optimally. As such, knowing what effects the application would have on the application servers before the application is actually deployed and run would be of great advantage to the organization.

Heretofore, others have attempted to provide ways to test applications or the devices on which they are run. However, no such attempt provides a way to test a scalability of an application server with respect to an application having a certain or large quantity of components/beans. Further, no such system has been provided that tests the scalability of multiple application servers implemented on a hierarchy of nodes within a distributed computing environment.

In view of the foregoing, there exist a need for a method, system and program product for analyzing a scalability of an application server. That is, a need exists for the scalability of an application server with respect to an application having a certain quantity of components/beans to be verified. To this extent, a need exists for an application to be generated based on a provided test configuration, and for the application to be deployed, installed and run on the application server. A further need exists for a client program to be created based on the test configuration to run against the application. Still yet, a need exists for certain performance metrics to be monitored as the application is deployed, installed and run, as well as during the running of the client program so that the scalability of the application can be determined.

SUMMARY OF THE INVENTION

In general, the present invention provides a method, system and program product for analyzing a scalability of an application server. Specifically, under the present invention, a test configuration is provided. The test configuration sets forth a particular enterprise computer architecture of nodes, servers and resources, as well as a quantity of components/beans for an application. Thereafter, the application is generated using a component template to replicate the provided quantity of components/beans, and is deployed, installed and started on the application server(s). After the application is started, a client program generated based on the test configuration is run against the application. Throughout the process, (e.g., as the application is being deployed, installed and started, and while the client program is being run), certain performance metrics are monitored to determine the scalability of the application server(s).

A first aspect of the present invention provides a method for analyzing a scalability of an application server, comprising: providing a test configuration, wherein the test configuration includes a component quantity, a node quantity, a server quantity and a resource quantity; creating an application based on the test configuration, wherein the application includes a quantity of components that match the provided component quantity; deploying, installing and starting the application on the application server; creating a client program based on the test configuration; running the client program against the application; and monitoring performance metrics during the deploying, installing, starting and running steps to verify the scalability of the application server.

A second aspect of the present invention provides a system for analyzing a scalability of an application server, comprising: a test configuration system for providing a test configuration, wherein the test configuration includes a component quantity, a node quantity, a server quantity and a resource quantity; an application generation system for creating an application based on the test configuration, wherein the application includes a quantity of components that match the provided component quantity, and wherein the application is deployed, installed and started on the application server; a client program system for creating a client program based on the test configuration, and for running the client program against the application; and a metric monitoring system for monitoring performance metrics while the application is deployed, installed and started and when the client program is run to verify the scalability of the application server.

A third aspect of the present invention provides a program product stored on a recordable medium for analyzing a scalability of an application server, which when executed, comprises: program code for providing a test configuration, wherein the test configuration includes a component quantity, a node quantity, a server quantity and a resource quantity; program code for creating an application based on the test configuration, wherein the application includes a quantity of components that match the provided component quantity, and wherein the application is deployed, installed and started on the application server; program code for creating a client program based on the test configuration, and for running the client program against the application; and program code for monitoring performance metrics while the application is deployed, installed and started and when the client program is run to verify the scalability of the application server.

In general, the present invention provides a method, system and program product for analyzing a scalability of an application server.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for analyzing a scalability of an application server. Specifically, under the present invention, a test configuration is provided. The test configuration sets forth a particular enterprise computer architecture of nodes, servers and resources, as well as a quantity of components/beans for an application. Thereafter, the application is generated using a component template to replicate the provided quantity of components/beans, and is deployed, installed and started on the application server(s). After the application is started, a client program generated based on the test configuration is run against the application. Throughout the process, (e.g., as the application is being deployed, installed and started, and while the client program is being run), certain performance metrics are monitored to determine the scalability of the application server(s).

It should be understood in advance that as used herein, the term "component" is intended to refer to a reusable program building block that can be combined with other components in the same or other computers in a distributed network to form an application. One example of a "component" is a "bean" (e.g., EJB), a JSP or a servlet, which are provided under the JAVA programming language.

Figure 1:
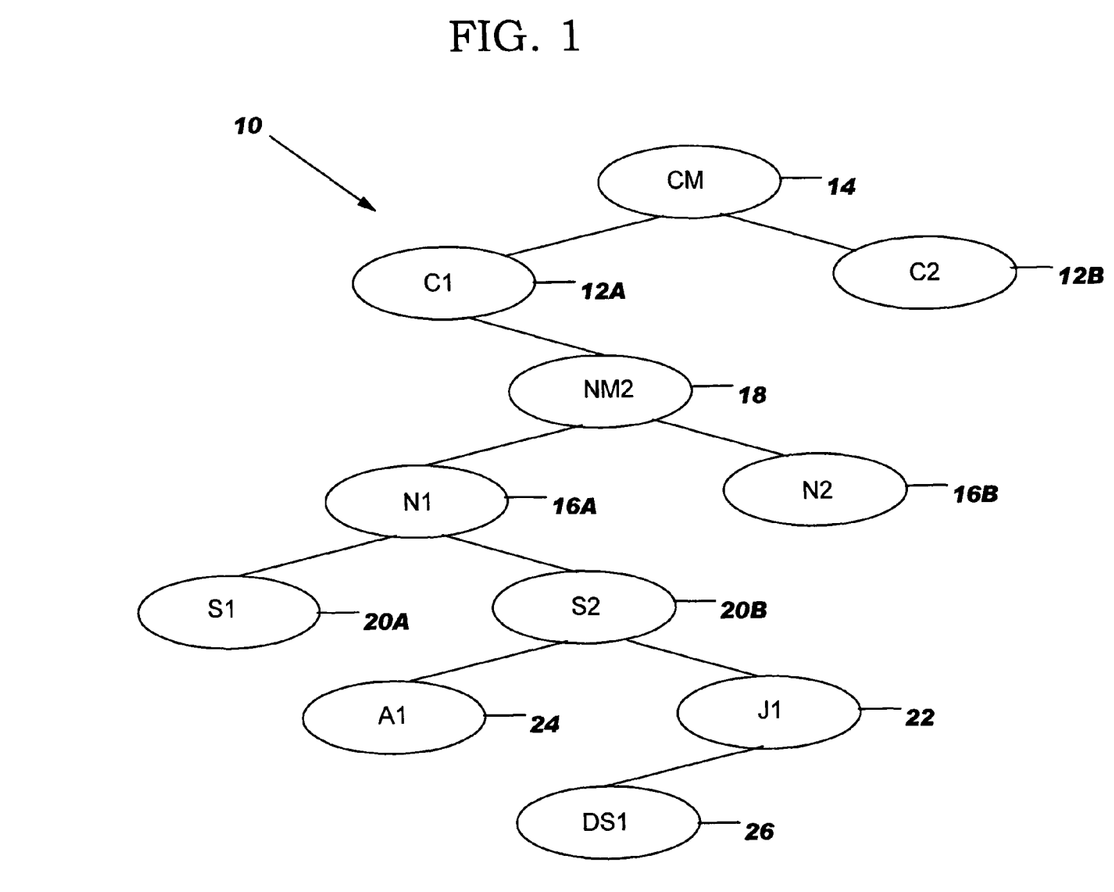
FIG. 1 depicts an illustrative enterprise computer architecture, according to the present invention.

Referring now to FIG. 1, an illustrative enterprise computer architecture 10 is depicted. As shown, architecture 10 comprises a hierarchy of cells 12A-B, nodes 16A-B and application servers 20A-B. Specifically, architecture 10 includes cells 12A-B, which are managed by a cell manager 14. Each cell, such as cell 12A, can include one or more nodes 16A-B that are themselves managed by node manager 18. Each node, such as node 16A, can include one or more application servers 20A-20B. Still yet, each application server, such as application server 20B, can include one or more resources 22 (e.g., JDBC providers, JMS providers, mail providers, resource environment providers, URL providers, resource adapters, etc.) and one or more applications 24 that could potentially include many components. Resources 22 could be used to access data objects such as data source 26. Although architecture 10 represents a typical architecture on which the present invention can be provided, it is not intended to be limiting. That is, many different architectures could be implemented under the present invention. Regardless, the present invention allows for the scalability of an application server such as application server 20B to be determined with respect to an application such as application 24.

It should be appreciated that architecture 10 is typically implemented in a distributed or network manner such as over the Internet, a local area network (LAN), a wide area network (WAN), a virtual private network (VPN), etc. To this extent, communication among nodes 16A-B and between cells 12A-B could occur via a direct hardwired connection (e.g., serial port), or via an addressable connection that may utilize any combination of wireline and/or wireless transmission methods. In any event, conventional network connectivity, such as Token Ring, Ethernet, WiFi or other conventional communications standards could be used. Moreover, connectivity could be provided by conventional TCP/IP sockets-based protocol. In this instance, cells 12A-B and nodes 16A-B could utilize an Internet service provider to establish connectivity to the server.

Figure 2:
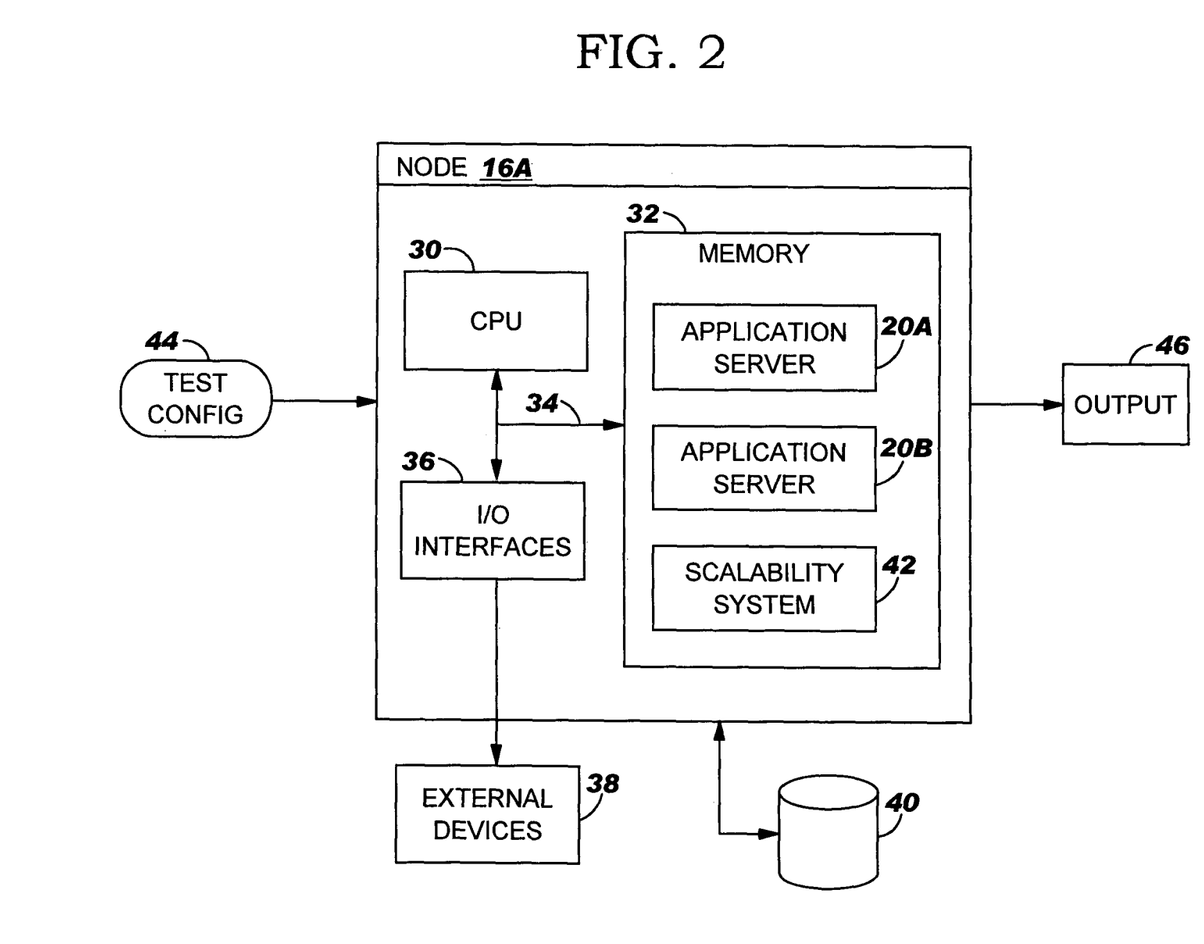
FIG. 2 depicts a more detailed diagram of one of the nodes shown in FIG. 1, according to the present invention.

Referring now to FIG. 2, a more detailed view of node 16A is depicted. It should be understood in advance that node 16A is intended to represent any type of computerized device capable of executing programs and performing the functions described herein. For example, node 16A could be a personal computer, a hand-held device, a workstation, etc. In addition, as indicated above, node 16A is typically implemented as part of a computerized network such as the Internet, a local area network (LAN), a wide area network (WAN), a virtual private network (VPN), etc.

As shown, node 16A comprises central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and server computer system. Memory 32 may comprise any known type of data storage and/or transmission media, including magnetic media, optical media, random access memory (RAM), read-only memory (ROM), a data cache, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LCD screen, hand-held device, keyboard, mouse, voice recognition system, speech output system, printer, monitor/display, facsimile, pager, etc. Bus 34 provides a communication link between each of the components in node 16A and likewise may comprise any known type of transmission link, including electrical, optical, wireless, etc.

Storage unit 40 can be any system (e.g., database) capable of providing storage for information under the present invention. Such information could include, for example, test configurations, scalability results, etc. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Furthermore, although not shown, additional components, such as cache memory, communication systems, system software, etc., may be incorporated into node 16A.

Shown in memory 32 of node 16A are application servers 20A-B and scalability system 42. Application servers 20A-B can be any type of application server now know or later developed. However, in a best mode of the present invention, application servers 20A-B are WebSphere Application Servers, which are commercially available from International Business Machines Corp. of Armonk, N.Y.

Under the present invention, scalability system 42 is capable of receiving a test configuration 44, determining the scalability of application servers 20A or 20B using the test configuration, and providing corresponding "result" output 46. In the illustrative embodiment described herein, the scalability of application server 20B will be tested. However, it should be appreciated that the same teachings could be used to determine the scalability of application server 20A.

Figure 3:
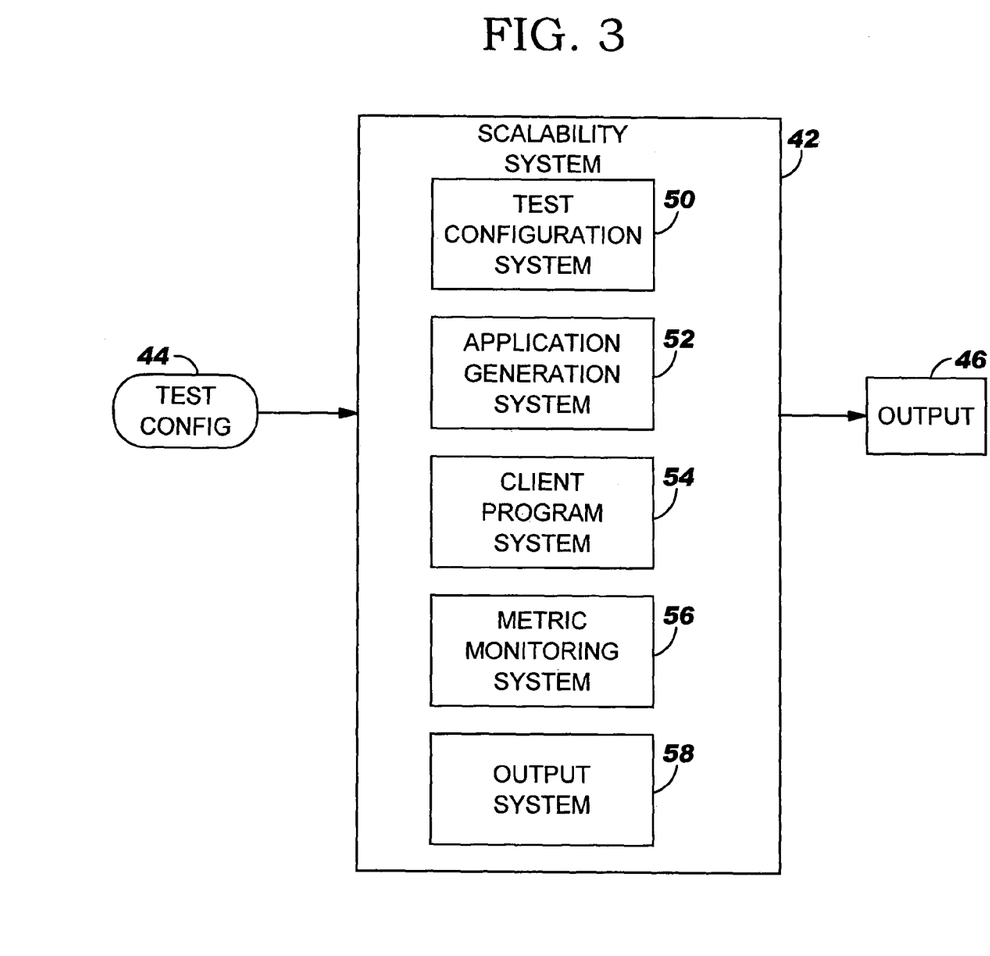
FIG. 3 depicts a more detailed diagram of the scalability system of FIG. 2, according to the present invention.

Referring now to FIGS. 2 and 3 collectively, the functions of scalability system 42 as it determines the scalability of application server 20B will be described in greater detail. As shown in FIG. 3, scalability system 42 includes test configuration system 50, application generation system 52, client program system 54, metric monitoring system 56 and output system 58. Test configuration system 50 allows test configuration 44 to be provided by a developer, administrator or the like. Specifically, test configuration system 50 will generate a configuration interface for the details of test configuration 44 to be provided.

Figure 4:
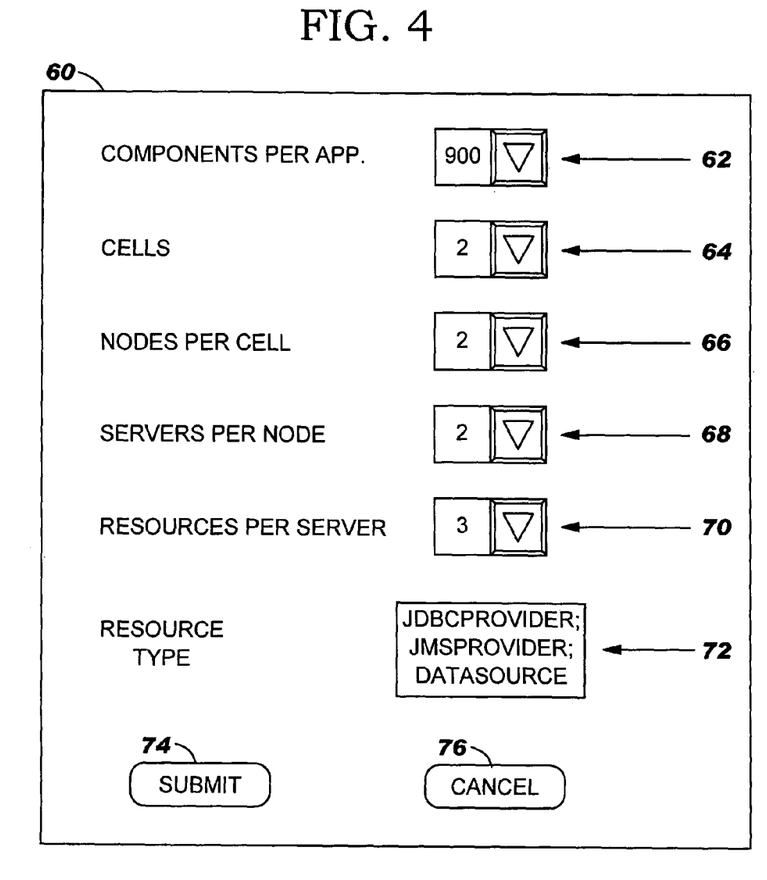
FIG. 4 depicts an illustrative configuration interface, according to the present invention.

Referring briefly to FIG. 4, an illustrative configuration interface 60 is provided. In general, configuration interface 60 allows a component quantity 62 (as used herein, the term "quantity" is intended to mean one or more), a cell quantity 64, a node quantity 66, a server quantity 68, a resource quantity 70 and resource types 72 to be designated. This allows the party providing the test configuration to not only specify a particular computer architecture (e.g., computer architecture 10 of FIG. 1), but also a particular component/bean count for an application that is used to determine the scalability of application server 20B. As indicated above, it is desirous to determine whether an application server is capable of handling an application with a certain or large quantity of components. For example, it is common for a JAVA-based application having 300 beans in one jar to take 2-3 hours to deploy. Accordingly, it would be advantageous to know whether the application would be more rapidly deployed if the beans were distributed over multiple jars. In addition, it could be helpful to also know how long deployment would take for different bean counts. By providing in initial test configuration via configuration interface 60, application server 20B can be adequately tested with respect to the application before it is actually distributed. It should be understood that configuration interface 60 as depicted in FIG. 4 is intended to be illustrative only and that many other variations could be implemented under the scope of the present invention. For example, input mechanisms other than drop-down menus could be utilized. In addition, other features could be input such as a jar quantity and a quantity of applications per server.

Referring back to FIGS. 2 and 3, once test configuration 44 is provided, application generation system 52 will generate the application based thereon. Specifically, the application will be generated with a quantity of components that match the provided component quantity. For example, since 900 components were designated via configuration interface 60 (FIG. 4), an application having 900 components (e.g., in one jar) will be generated. In a typical embodiment, the components are generated/replicated using a component template. The component template can be predefined and provided with the scalability system 42, or a user could provide his/her own. In any event, once application is generated, it will be deployed, installed and started on application server 20B. During each such step, however, certain performance metrics will be monitored by metric monitoring system 56. Specifically, during the deployment of the application, metric monitoring system 56 will monitor deployment metrics such as enterprise archive (EAR) file size before and after deployment, heap size, memory consumption, processor usage, application deploy time, etc. During the installation of the application, installation metrics such as memory consumption, processor usage, application install time, etc. will be monitored. Still yet, during the start of the application, start metrics such as memory increase, processor usage, application start time, etc. will be monitored.

Once the application has been started, client program system 54 will create and run a client program, which can be single or multithreaded, against the application. Similar to the application, the client program is created based on test configuration 44. That is, for a proper testing, every component in the application should be "touched." Accordingly, the client program will be created to simulate use of the application by a quantity of clients that match the provided component quantity. Thus, if 900 components were designated via configuration interface 60 (FIG. 4), the client program will have/simulate use of the application by 900 clients. In general, the client program will call the methods of the application to perform database transactions (e.g., on storage unit 40 of FIG. 2). Just as during the deployment, installation and starting of the application, certain performance metrics will be monitored during the running of the client program. In a typical embodiment, metric monitoring system 56 will monitor client metrics such as memory consumption, processor usage, transaction time, application run time, etc. as the client program runs.

Each of the performance metrics monitored during the process is used by output system 58 to generate output 46 (e.g., charts, graphs, etc.) that indicates the scalability of application server 20B with respect to the application. Specifically, output 46 can indicate the time for deployment of the application with the provided component quantity in a single jar, or up to n jars. This allows a developer or the like to see which component/jar configuration provided the best results. Output 46 could also indicate the time for deployment of the provided component quantity as well as other component quantities. For example, if the developer indicated a component quantity of 900 via configuration interface 60 (FIG. 4), output system 58 could not only provide the monitored time for deployment for the 900 component application, but also what it would have been for an 800, 1000, etc. component application so that the developer has a basis for comparison. The developer can further vary the quantity of jars from 1 to N keeping the quantity of components or beans constant to determine the scalability of the deploy tool of application server 20B and hence application server 20B with respect to the quantity of jars. Still yet, output system 58 could generate output 46 pertaining to the other performance metrics monitored such as memory usage, ratio of deployed EAR file size to undeployed EAR file size, etc. In any event, output 46 can be used by the developer to find an optimal configuration so that the scalability of application server 20B is maximized.

Figure 5:
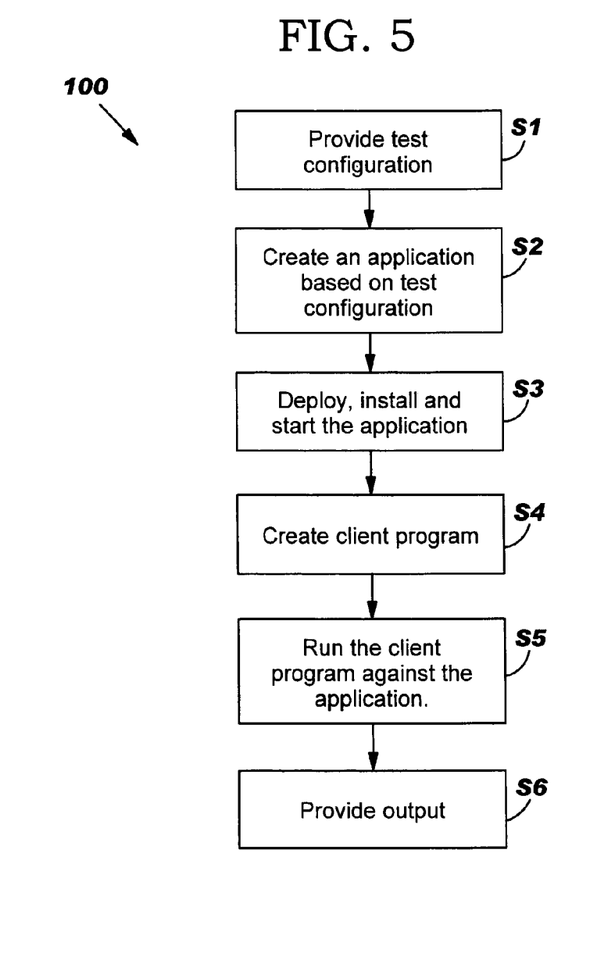
FIG. 5 depicts a method flow diagram according to the present invention.

Referring now to FIG. 5, a method flow diagram 100 according to the present invention is shown. As depicted, first step S1 is to provide a test configuration. As indicated above, the test configuration can include a component quantity, a node quantity, a server quantity and a resource quantity. Second step S2 is to create an application based on the test configuration. In this step, the application should include a quantity of components that match the provided component quantity. Third step S3 is to deploy, install and start the application on the application server while monitoring deploy, install and start metrics. Fourth step S4 is to create a client program based on the test configuration. Fifth step S5 is to run the client program against the application while monitoring client metrics. Sixth step S6 is to provide output based on the monitored metrics.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for analyzing a scalability of an application server, comprising:
    providing a test configuration, wherein the test configuration includes a component quantity generated using a component template, a jar quantity for containing the component quantity, a node quantity, a server quantity, a resource quantity, and resource types;
    creating an application based on the test configuration, wherein the application includes a quantity of components that match the provided component quantity and a quantity of jars that match the provided jar quantity;
    deploying, installing, and starting the application on the application server, wherein the application server is implemented on a node, comprising a computerized device, that is part of a hierarchy of nodes that match the provided node quantity, and wherein the application is deployed using a deploy tool of the application server;
    creating a client program based on the test configuration, wherein the client program simulates use of the application by a quantity of clients that match the provided component quantity;
    running the client program against the application by conducting a database transaction;
    monitoring performance metrics during the deploying, installing, starting and running steps to verify the scalability of the application server, the monitoring comprising monitoring of:
    deployment metrics selected from the group consisting of an enterprise archive file size, a heap size, a memory consumption, a processor usage, and an application deploy time during the deploying step;
    monitoring installation metrics selected from the group consisting of a memory consumption, a processor usage, and an application install time during the installing step;
    monitoring start metrics selected from the group consisting of a memory increase, a processor usage, and an application start time during the starting step; and
    monitoring client metrics selected from the group consisting of a memory consumption, a processor usage, a transaction time, and an application run time during the running step;
    and
    generating output based on the performance metrics, wherein the output includes a comparison of the performance metrics for the provided component quantity and the provided jar quantity, versus a potential performance metric for the application with at least one of a different quantity of components and a different quantity of jars.

2. A computer-implemented system for analyzing a scalability of an application server, comprising:
    at least one processing unit;
    a memory operably associated with the at least one processing unit; and
    a scalability analysis system storable in the memory and executable by the at least one processing unit, the scalability analysis system comprising:
    a test configuration system for providing a test configuration, wherein the test configuration includes a component quantity generated using a component template, a jar quantity for containing the component quantity, a node quantity, a server quantity, a resource quantity, and resource types, and wherein the test configuration system provides a graphical user interface for inputting the test configuration;
    an application generation system for creating an application based on the test configuration, wherein the application includes a quantity of components that match the provided component quantity and a quantity of jars that match the provided jar quantity, wherein the application is deployed, installed and started on the application server, and wherein the application server is implemented on a node, comprising a computerized device, that is part of a hierarchy of nodes that match the provided node quantity, and wherein the application is deployed using a deploy tool of the application server;
    a client program system for creating a client program based on the test configuration, and for running the client program against the application by conducting a database transaction, wherein the client program simulates use of the application by a quantity of clients that match the provided component count;
    a metric monitoring system for monitoring performance metrics while the application is deployed, installed, and started and when the client program is run to verify the scalability of the application server, wherein the metric monitoring system monitors:
    deployment metrics selected from the group consisting of an enterprise archive file size, a heap size, a memory consumption, a processor usage, and an application deploy time as the application is being deployed;
    installation metrics selected from the group consisting of a memory consumption, a processor usage, and an application install time as the application is being installed;
    start metrics selected from the group consisting of a memory increase, a processor usage, and an application start time as the application is being started; and client metrics selected from the group consisting of a memory consumption, a processor usage, a transaction time, and an application run time as the client program runs;

and an output system for generating output based on the performance metrics, wherein the output includes a comparison of illustrates the performance metrics for the provided component quantity and the provided jar quantity, versus a potential performance metric for the application with at least one of a different quantity of components and a different quantity of jars.

3. A non-transitory computer-readable storage-medium storing computer instructions which when executed, enable a computer system to analyze a scalability of an application server, the computer instructions comprising:

providing a test configuration, wherein the test configuration includes a component quantity generated using a component template, a jar quantity for containing the component quantity, a node quantity, a server quantity, a resource quantity, and resource types;

creating an application based on the test configuration, wherein the application includes a quantity of components that match the provided component quantity and a quantity of jars that match the provided jar quantity;

deploying, installing, and starting the application on the application server, wherein the application server is implemented on a node, comprising a computerized device, that is part of a hierarchy of nodes that match the provided node quantity, and wherein the application is deployed using a deploy tool of the application server;

creating a client program based on the test configuration, wherein the client program simulates use of the application by a quantity of clients that match the provided component quantity;

running the client program against the application by conducting a database transaction;

monitoring performance metrics during the deploying, installing, starting and running steps to verify the scalability of the application server, the monitoring comprising monitoring of:

deployment metrics selected from the group consisting of an enterprise archive file size, a heap size, a memory consumption, a processor usage, and an application deploy time during the deploying step;

monitoring installation metrics selected from the group consisting of a memory consumption, a processor usage, and an application install time during the installing step;

monitoring start metrics selected from the group consisting of a memory increase, a processor usage, and an application start time during the starting step; and monitoring client metrics selected from the group consisting of a memory consumption, a processor usage, a transaction time, and an application run time during the running step;

and generating output based on the performance metrics, wherein the output includes a comparison of the performance metrics for the provided component quantity and the provided jar quantity, versus a potential performance metric for the application with at least one of a different quantity of components and a different quantity of jars.

* * * * *